UNITED STATES PATENT OFFICE.

ADDISON REGAN, OF GLENMORE, GEORGIA.

VERMIFUGE.

SPECIFICATION forming part of Letters Patent No. 314,477, dated March 24, 1885.

Application filed June 18, 1884. (No specimens.)

*To all whom it may concern:*

Be it known that I, ADDISON REGAN, a citizen of the United States, and a resident of Glenmore, in the county of Ware and State of Georgia, have invented certain new and useful Improvements in Medical Compounds; and I do hereby declare that the following is a full, clear, and exact description of the invention, which will enable others skilled in the art to which it appertains to make and use the same.

My discovery has relation to medical compounds known as "vermifuges;" and it consists in the composition which will be hereinafter more fully described and claimed.

To prepare this composition I proceed as follows: I first take one-half bushel of China berries, (the fruit of *Smilax China*,) which are placed in a suitable vessel, after which one barrel of boiling water is poured over them. Then they are left to stand until the mixture sours. I then take one-half barrel of good cornmeal and stir it up with a similar quantity of boiling water, when I let this mixture stand for about fifty hours, and then stir into it half a barrel of pure cold water. After stirring it well I add to this mixture one-half gallon of meal of sprouted corn and let it stand until it commences to work or ferment. After both of these mixtures have been left standing for about ten days I mix them together and distill the mixture in a copper still over a slow fire. The distilled spirits are carefully filtered through a mixture of clean wool and charcoal, after which they are ready for bottling.

The doses in which this mixture is to be administered depends upon the age of the child—from a few drops every two hours to one or two tea-spoonfuls taken in a little water. If administered to an adult, as much as one table-spoonful may be given at a time, preferably about half an hour before meal times. A little sugar may be added, if desired.

I claim and desire to secure by Letters Patent of the United States—

The herein-described vermifuge mixture, consisting of a distillate of China berries (*Smilax China*) and cornmeal, as set forth.

In testimony that I claim the foregoing as my own I have hereunto affixed my signature in presence of two witnesses.

ADDISON REGAN.

Witnesses:
 J. M. PURDOM,
 R. J. McQUAIG.